United States Patent [19]

Loomis et al.

[11] Patent Number: 5,076,983

[45] Date of Patent: Dec. 31, 1991

[54] POLYHYDROXY ACID FILMS

[75] Inventors: Gary L. Loomis, Drexel Hill, Pa.;
George J. Ostapchenko, Wilmington

[73] Assignee: E. I. Du Pont de Nemours and Company, Wilmington, Del.

[21] Appl. No.: 552,551

[22] Filed: Jul. 16, 1990

[51] Int. Cl.$^5$ ............... B29C 47/00; B29C 55/12
[52] U.S. Cl. .................. 264/101; 264/210.7; 264/235.8; 264/290.2; 264/331.21; 525/413; 525/415; 528/354; 528/359
[58] Field of Search ............... 264/101, 102, 210.7, 264/235.8, 290.2, 331.18, 331.21; 525/413, 415; 528/354, 359, 361; 549/274

[56] References Cited

U.S. PATENT DOCUMENTS

| | | | |
|---|---|---|---|
| 1,095,205 | 5/1914 | Gruter et al. | 549/274 |
| 2,668,162 | 1/1954 | Lowe | 528/354 X |
| 2,703,316 | 3/1955 | Schneider | 528/354 |
| 3,878,284 | 4/1975 | Schmitt et al. | 264/331.21 X |
| 4,033,938 | 7/1977 | Augurt et al. | 528/354 |
| 4,727,163 | 2/1988 | Bellis | 549/274 |
| 4,797,468 | 1/1989 | De Vries | 528/354 |
| 4,800,219 | 1/1989 | Murdoch et al. | 525/413 |
| 4,835,293 | 5/1989 | Bhatia | 549/274 |
| 4,895,681 | 1/1990 | Herrmann et al. | 260/410.6 |
| 4,966,982 | 10/1990 | Ono et al. | 549/274 |
| 4,983,745 | 1/1991 | Muller et al. | 549/274 |
| 4,990,222 | 2/1991 | Aigner et al. | 203/91 |

FOREIGN PATENT DOCUMENTS

| | | |
|---|---|---|
| 3632103 | 3/1988 | Fed. Rep. of Germany . |
| 3708915 | 9/1988 | Fed. Rep. of Germany . |
| WO90/01521 | 2/1990 | PCT Int'l Appl. . |

OTHER PUBLICATIONS

English-Language Translation of Fed. Rep. of Germany 3,724,933 (Published Feb. 9, 1989).
English-Language Translation of Fed. of Rep. of Germany 3,708,915 (Published Sep. 29, 1988).

Primary Examiner—Leo B. Tentoni
Attorney, Agent, or Firm—Michael K. Boyer; Charles E. Krukiel

[57] ABSTRACT

The present invention relates to a process for producing degradable, shrinkable films of polyhydroxy acid and plasticizers including melt processing the materials to obtain uniform composition, forming the composition into a film, and biaxially orienting the film. Also, non-shrinkable films are produced by heat-setting the biaxially oriented films at temperature above the composition glass transition temperature and below its melt temperature while maintaining the film under restraint. Films thus produced are useful for disposable, environmentally benign packaging and other conventional film uses.

42 Claims, No Drawings

POLYHYDROXY ACID FILMS

BACKGROUND OF THE INVENTION

This invention relates to certain polyhydroxy acid compositions and films produced from these compositions, which are useful as degradable packaging materials.

High molecular weight polymers of hydroxy acids and cyclic dimer products of esterification of alpha hydroxy acids, particularly glycolic acid and lactic acid, are well known to be degradable, and are found useful for disposable packaging that will substantially and readily deteriorate to harmless byproducts under conditions existing in the natural environment or employed in suitable waste treatment facilities. It is desirable for packaging material to possess additional beneficial physical properties including optical clarity, tensile strength, resistance to puncture and, optionally, to be shrinkable. Shrinkable films are useful for "shrink-wrap" packaging. Shrink-wrapping is the process by which a film structure placed around an object contracts upon application at convective of radiant heat, to provide a tight, protective, self-sealing container. In order to make polyhydroxy acid films shrinkable, the polyhydroxy acid films must be oriented by mechanical stretching procedures.

Many high molecular weight polyhydroxy acids of commercial significance contain large proportions of specific asymmetrical, carbon atoms and may be, therefore, appreciably crystalline and brittle. Such polymers are less able to withstand the demanding film-forming and orientation processes without excessive film breakage causing low yield. Further, polyhydroxy acid films possessing an appreciable crystallinity can become brittle on aging.

A method of making a polyhydroxy acid film pliable is to plasticize the film by incorporating large amounts of monomeric and low molecular weight oligomeric alpha hydroxy acid species. However, such plasticized polyhydroxy acid compositions can be difficult to extrude into films because they stick to the film-making equipment, produce films of non-uniform thickness and the plasticizer often fouls the equipment. When successfully processed to film form, plasticized polyhydroxy acid compositions, by themselves, have glass transition temperatures, Tg, which are near ambient temperatures and may not be stable under storage conditions found in warm climates. In addition, plasticized polyhydroxy acid composition may not have an appropriate rate of degradation to maintain structural integrity for the intended useful life of the package, and, when subsequently oriented to shrinkable film, may not exhibit the heat set shrink force needed for successful application to the product or for good package strength.

Schneider, discloses in U.S. Pat. No. 2,703,316 the manufacture of films from lactic acid. Schneider's polylactic acid from commercial lactic acid was inherently racemic and therefore the film produced therefrom would suffer from defects similar to those of highly plasticized polyhydroxy acid compositions.

It is desirable to provide degradable compositions which may be processed economically, and with a high yield, into an optically clear, robust and, biaxially oriented film for commercially useful, disposable packaging applications.

SUMMARY OF THE INVENTION

According to the present invention, there is now provided a process for making degradable, shrinkable polymer films comprising:
  (a) melt processing the polymeric materials while subjecting the melt to sufficient mechanical agitation to obtain a uniform composition comprising:
  (I) from 92 to 99.9 wt % polyhydroxy acid polymer containing at least one hydroxy acid unit selected from among:
    (i) (OCR'R"COOCR'R"CO)q
    (ii) [O(CR'R")nCO]p
    (iii) (OCR'R"CR'R"OCR'R"CO)r
    (iv) (OCR'R"CR'R"OCR'R"CR'R"CO)s
    (v) copolymers of (i)–(iv) with non-hydroxy acid comonomers
  wherein n is 2, 4 or 5;
    p, q, r and s are integers, the total of which may range from about 350 to 5,000;
    R' and R" is hydrogen, hydrocarbyl containing 1 to 12 carbon atoms, or substituted hydrocarbyl containing 1 to 12 carbon atoms,
  and having sufficient molecular weight to produce self-supporting film,
  (II) from 0.10 to 8 wt % plasticizers comprising monomeric hydroxy acids, cyclic dimers of monomeric hydroxy acids, non-cyclic dimers of monomeric hydroxy acids and other oligomers of monomeric hydroxy acids up to molecular weight of 450;
  (b) forming the composition into a film of uniform thickness from about 0.05 to 2 mm;
  (c) biaxially orienting the film thus produced by stretching the film to greater than two times the initial machine direction and transverse direction dimensions of the film, wherein the orienting is conducted at a temperature above the polyhydroxy acid glass transition temperature and below the melting temperature of the composition.

There is also provided a process for making degradable, non-shrinkable polymer films having shrinkage values less than 5% at 100° C.

There are further provided articles made by the foregoing processes.

DETAILED DESCRIPTION OF THE INVENTION

Degradability of the films produced by this invention is achieved by use of polyhydroxy acids. "Polyhydroxy acids" as used herein refers to polymers containing at least one hydroxy acid unit selected from among:
  (i) (OCR'R"COOCR'R"CO)q
  (ii) [O(CR'R")nCO]p
  (iii) (OCR'R"CR'R"OCR'R"CO)r
  (iv) (OCR'R"CR'R"OCR'R"CR'R"CO)s
  (v) copolymers of (i)–(iv) with non-hydroxy acid comonomers
wherein n is 2, 4 or 5;
  p, q, r and s are integers, the total of which may range from about 350 to 5,000;
  R' and R" is hydrogen, hydrocarbyl containing 1 to 12 carbon atoms, or substituted hydrocarbyl containing 1 to 12 carbon atoms.

Examples of suitable non-hydroxy acid comonomers include those capable of condensation polymerization with lactide or lactic acid (e.g., lactones such as epsilon-caprolactone, beta-propio-lactone, alpha,alpha-dimethyl-beta-propiolactone and dodecanolactone; lactams; other hydroxy acids such as glycolic acid; and amino acids). For a more complete list refer to U.S. Pat. No. 4,800,219 at column 9, line 27. The values of p, q, r and s are selected to impart the degree of crystallinity and rate of crystallization which is appropriate for oriented film production.

Polyhydroxy acids may be synthesized by polymerization directly from hydroxy acid precursors, or by polymerization of the cyclic monomeric or cyclic dimeric lactone of hydroxy acid precursors. When a polyhydroxy acid is produced from one or more lactones, the choice of cyclic monomeric or cyclic dimeric specie as polymerization monomer will depend upon the hydroxy acid type. Polymerization from cyclic lactone is preferred for producing high molecular weight polyhydroxy acids because equilibrium reactions with the intermediate, cyclic dimer and low molecular weight species place practical limits on the molecular weight of polymers produced directly from hydroxy acids.

Polyhydroxy acids of this invention have molecular weights at least high enough to provide sufficient viscosity and strength to form a sustainable film from the polymer melt. Polyhydroxy acids which possesses an average molecular weight ranging from about 50,000 to about 600,000; and preferably from about 150,000 to about 450,000 are effective in this invention. If the molecular weight is too high, excessive degradation occurs at the temperatures required to melt process the compositions.

The term "degradable" as used herein with respect to the polyhydroxy acids means that the polyhydroxy acid portion of the degradable material is biodegradable and, more importantly, degradable by hydrolysis. The degradation rate is consistent with its intended usage (i.e., the product does not degrade significantly in normal storage and usage, but will degrade in a reasonable time, after discarding). For hydrolysis degradation, slightly acidic or basic conditions may be used advantageously. The rate of hydrolysis degradation is affected by degree of polymer crystallinity and amount of water exposure. As a result of hydrolysis degradation, monomer units can be recovered if desired for reconversion to useful polyhydroxy acid, or the monomer units can be discarded as an environmentally benign waste material.

"Hazy" products, generally outside the scope of this invention, have impaired transparency caused by the exuding of low molecular weight plasticizer to the surfaces of the films or high crystalline content of the starting polymer.

The term "ambient temperature" refers to the highest temperature at which the film product will be exposed during use or storage. Normally, this will range from room temperature (28° C.) or below when under refrigeration, up to 40° C. or more when in warehouse storage.

Preferred polyhydroxy acids of the present invention are those wherein 55-99 mol % is the major component composed of the (i) hydroxy acid units discussed above wherein R' is hydrogen and R" is the methyl radical, and having 80-97 mol % of asymmetric carbon atoms R-configuration and 3-20 mol % S- configuration or 80-97 mol % S- configuration and 3-20 mol % R-configuration; and wherein 1-45 mol % is the minor component composed of either an (i) hydroxy acid unit of such asymmetric carbon content that the total R-or S- configuration in major and minor components do not exceed 97 mol % of asymmetric carbon atoms, or any hydroxy acid units (ii) to (iv) or suitable non-hydroxy acid comonomers.

A preferred polyhydroxy acid may, for example, contain a major component of 65 mol % hydroxy acid unit (i) in which 90 mol % of asymmetric carbon atoms are S- configuration. In this example, the minor component will be 35 mol % and might be completely composed of hydroxy acid unit (ii) or a suitable non-hydroxy acid comonomer. In this same example, the minor component might be additional hydroxy acid unit (i) but the fraction of asymmetric carbon atoms which are S- configuration in the minor component can be no greater than that which when added to the S- atoms of the major component, do not raise the S- atom content of the total above 97 mol %.

In more preferred embodiments of the present invention, the range of R- and S- asymmetric carbon atoms in the major component of polyhydroxy acid is 85-96 mol % and the total R- and S- asymmetric carbon atoms in major and minor components does not exceed 96 mol %.

The terms "R-" and "S- " refer to the standard nomenclature for identifying stereoisomer configurations of asymmetrical carbon. The percentages of R- and S- carbons indicated herein refer only to fractions of asymmetrical carbon atoms in the polymer chains and not to total carbon atoms in the polymer chains. Asymmetrical carbon atoms are those having no less than four different substituent radical groups attached to them.

The preferred compositions have narrow ranges of selected asymmetrical carbon atoms because polymers containing more equal fractions of R- and S- carbon atoms 1) demonstrate accelerated degradation by hydrolysis and 2), produce films possessing adjacent layers which often adhere to each other and which are prone to degradation during film processing.

Also, films made outside these ranges may be hazy and/or brittle. For example polymer films having fractions above the 97% S- carbon atom range are substantially crystalline after hot processing, such as in film production. Crystallinity is detrimental to film-forming capability, to the optical clarity of the films formed from crystalline polymers and to the ability to successfully orient films formed from crystalline polymers by stretching. Crystalline polymer films are also more brittle than amorphous polymer films. A method for reducing the negative effects of highly crystalline polymer on film properties is to plasticize the polymer by incorporating and dispersing monomeric, low molecular weight oligomeric species within the polymer matrix. Plasticizers for the polyhydroxy acids of the present invention are monomeric hydroxy acids, lactides of monomeric hydroxy acids, lactyl lactate non-cyclic dimers of monomeric hydroxy acids and other oligomers of monomeric hydroxy acids having a molecular weight of up to 450.

It has been found that an excessive concentration of plasticizers in the polyhydroxy acids produces films of uneven thickness. Where films are made by casting onto drums, excessive plasticizer may separate from the film, stick to and foul the drum, or may cause the film to stick to the drum. Thus, it has been found necessary to use a polymer containing a minimal amount of plasticizer. The amount of plasticizers needed to obtain useful films in accordance with the present invention ranges from about 0.10 to about 8 wt %, and preferably from about 0.2 to 6 wt %. A highly preferable composition range is from about 0.2 to 0.4 wt % plasticizer. These plasticizer levels are based upon the concentrations of the polyhydroxy acid and plasticizer in the feedstock which is utilized to produce the film and do not necessarily correspond to the concentrations of the plasticizer, in the film produced from the compositions of the present invention. Plasticizer content may be determined by the lactide content analysis methods taught in the Journal of Applied Polymer Science, Kohn, Van den Berg, Van de Ridder and Feyen, volume 29, pages 4265-4277 (1984). Should it become necessary to reduce the concentration of plasticizers in a plasticizer-rich composition, a devolatilizing extruder can be used either as a separate step or during film extrusion.

The shrinkage value is an indicator of film shrinkage performance. The shrinkage value is determined by (1) cutting a 10 cm by 10 cm square sample from an oriented film such that the edges of the sample are parallel to the machine and transverse film directions; (2) immersing the sample in boiling water for 1 minute; (3) measuring and averaging the length and width of the boiled film; and (4) calculating percent shrinkage value by subtracting the averaged boiled film length and width from 10, then multiplying the difference by 10. For example, assuming that the average length and width of a boiled film sample are 6 cm, the film shrinkage value is calculated as (10−6) times 10, or 40%.

Polymeric Compositions of the present invention are formed into films of uniform thickness from ranging about 0.05 to 2 mm prior to orientation. Film forming may be accomplished by melt extrusion and sheet casting, blow molding, precipitation from solvent or other means which are well known to produce films from polymers. Films thus formed may be fed directly to orientation equipment or wound onto spools or otherwise conveniently collected for storage and subsequent processing or use.

Polymeric films useful in shrink-wrap packaging applications may be prepared by biaxially orienting the previously discussed polyhydroxy acid composition films. Biaxially orienting means to stretch the film along the direction in which it travels, called the machine direction (MD), and in directions 90 degrees to the machine direction in the plane of the film, known as the transverse direction (TD), thereby extending the film to at least two times the films initial MD and TD direction dimensions. Biaxial orienting of the present invention includes simultaneous MD and TD stretching and sequential stretching. One method of simultaneous biaxial orienting entails blowing a tubular film while stretching the tube in the machine direction. The biaxially orientation is performed while heating and maintaining the film temperature above the polyhydroxy acid glass transition temperature and below its melting temperature. The polyhydroxy acid glass transition temperature is measured by differential scanning calorimetry (DSC). The glass transition temperature decreases with increasing plasticizer content and is about 60° C. for a composition containing 0.28 wt % plasticizer but only 40° C. for a composition containing 20 wt % plasticizer. High plasticizer concentrations have been found to be unacceptable because the glass transition temperatures produced therefrom are too near temperatures expected during storage and transport in warm climate regions.

Biaxially oriented films can be rendered non-shrinkable by heat-setting. Heat-setting is achieved by subjecting the oriented polymeric film to a temperature above the polyhydroxy acid glass transition temperature but below its melting temperature while maintaining the film under restraint. The duration of heat-setting found effective is from about 1 to 120 seconds and preferably from about 1 to 80 seconds. "Nonshrinkable" products of this invention are defined as films that will not shrink more than 5% when immersed in boiling water for 1 minute. Nonshrinkable degradable films are useful, for example, in the production of microwave-cookable food packaging, trash bags and waste container liners.

EXAMPLES

The present invention is illustrated by the following representative examples of certain preferred embodiments, wherein all parts, proportions, and percentages are by weight, unless otherwise indicated. All units of weight and measure other than SI units have been converted to SI units.

EXAMPLE 1

A polyhydroxy acid composition containing greater than 85% S- and less than 15% R-asymmetrical carbon atoms and having molecular weight of about 275,000, and containing less than 0.4% plasticizer as determined by lactide content analysis, is extruded into films of about 0.03 and 0.23 mm thickness by a 28 mm Werner-Pfleiderer twin-screw extruder equipped with a devolatilization port and a 25 cm wide, vertical die having 2.5 mm die gap. The films are isolated on a 25 cm diameter, chrome-plated, cooling roll maintained at 20° C. Both films are weak and brittle.

The 0.23 cm thickness film is biaxially oriented by stretching to three times its original width and length at 65° C. using a T.M. Long Co., Inc. Film Stretcher. The oriented film is strong, stiff, optically clear and glossy, and has a good shrinkable film product shrinkage value of 66%. The oriented film is placed under restraint and heat set for 1 minute at 130° C. It remains strong and flexible and has a shrinkage value of 4% which is good for non-shrinkable film products.

EXAMPLE 2

Prior to heat setting a sample of the biaxially oriented film of Example 1 is wrapped around a 7.6 cm wide, 12.7 cm long, 0.64 cm high pad of paper and held in place with double-sided adhesive tape. The wrapped package is placed in a hot air convection oven at 100° C. for one minute. The film shrinks uniformly around the pad and is optically clear and glossy. After storage at room temperature for 15 months, no film degradation is observed, indicating its usefulness in shrink-wrap applications.

In contrast, a polyhydroxy acid composition containing greater than 85% S- and less than 15% R- asymmetrical carbon atoms, having 20% plasticizer as determined by lactide content analysis, is extruded into film having 0.23 mm thickness by the method of Example 1. After a few minutes of operation, the cooling roll surface becomes coated with plasticizer which decreases heat transfer efficiency of the roll causing the film to have non-uniform thickness and optically poor, i.e., having hazy patches ranging roughly in size from 15 to 40 cm 2, film surface demonstrating that the amount of plasticizer in initial polymer was too great.

This film is biaxially oriented by stretching to three times its original width and length at 46° C. using a T.M. Long Co., Inc. Film Stretcher. An unacceptable soft hazy film that tends to shrink slowly at room temperature is produced.

EXAMPLE 3

A polyhydroxy acid composition containing somewhat less than 97% S- and more than 3% R-asymmetrical carbon atoms and having molecular weight of about 250,000–300,000 and about 5% plasticizer as determined by lactide content analysis, is extruded into an optically clear, 1.5 mm thick film by the method of Example 1. The film is biaxially oriented by the method of Example 1 to produce an optically clear film having shrinkage value of 71%. In contrast, a polyhydroxy acid composition of somewhat greater than 97% S- and less than 3% R- asymmetrical carbon atoms and having molecular weight of about 300,000 and about 6% plasticizer as determined by lactide content analysis, is extruded into a 1.5 mm thick film that is hazy. The film is biaxially oriented as described in Example 1 to produce a film that becomes brittle after aging 6 months at room temperature, making it unsuitable for use in many commercial packaging applications.

What is claimed is:

1. A process for making a self-supporting polymer film comprising:
    (a) melt processing a polymeric composition comprising:
        (I) from about 92 to about 99.9 wt % of a polyhydroxy acid polymer comprising at least one hydroxy acid unit selected from the group consisting of:
            (i) (OCR'R"COOCR'R"CO)q;
            (ii) [O(CR'R")nCO]p;
            (iii) (OCR'R"CR'R"OCR'R"CO)r;
            (iv) (OCR'R"CR'R"OCR'R"CR'R"CO)s; and
            (v) copolymers of (i)–(iv) with non-hydroxy acid comonomers
            wherein n is 2, 4 or 5;
            p, q, r and s are integers, the total of which ranges from about 350 to about 5,000; and R' and R" comprise at least one material selected from the group consisting of hydrogen, a hydrocarbyl containing 1 to 12 carbon atoms, and substituted hydrocarbyl containing 1 to 12 carbon atoms, and
        (II) from about 0.10 to about 9 wt % plasticizers comprising at least one plasticizer selected from the group consisting of monomeric hydroxy acids, cyclic dimers of monomeric hydroxy acids, non-cyclic dimers of monomeric hydroxy acids and oligomers of monomeric hydroxy acids having a molecular weight of up to about 450;
    (b) forming said composition into a film; and
    (c) biaxially orienting said film by stretching said film to at least two times the initial machine direction and transverse direction dimensions of said film, wherein the orienting is conducted at a temperature above the polyhydroxy acid glass transition temperature and below the melting temperature of the composition.

2. A process of claim 1, wherein said polyhdyroxy acid polymer has an average molecular weight from about 50,000 to about 600,000.

3. A process of claim 1, wherein said polyhydroxy acid polymer has an average molecular weight from about 150,000 to about 450,000.

4. A process of claim 3, wherein at least 80% of the total moles of said at least one hydroxy acid unit comprises (OCR'R"COOCR'R"CO)q.

5. A process of claim 3, wherein at least 85% of the total moles of said at least one hydroxy acid unit comprises (OCR'R"COOCR'R"CO)q.

6. A process of claim 4, wherein R'comprises hydrogen and R"comprises a methyl radical.

7. A process of claim 5, wherein R'comprises hydrogen and R"comprises a methyl radical.

8. A process of claim 6, wherein the carbon atoms in the polymer chain of said polyhydroxy acid polymer comprise a configuration selected from the group consisting of R- and S- configurations.

9. A process of claim 7, wherein the carbon atoms in the polymer chain of said polyhydroxy acid polymer comprise a configuration selected from the group consisting of R- and S- configurations.

10. A process of claim 3, wherein the polyhydroxy acid polymer comprises:
    about 55 through about 99 mol % (OCR'R"COOCR'R"CO)q, wherein R' comprises hydrogen and R" comprises a methyl radical, and wherein said (OCR'R"COOCR'R"CO)q comprises about 80–97 mol % of asymmetric carbon atoms R- configuration and about 3–20 mol % S- configuration, and further comprising
    about 1 through about 45 mol % of at least one member selected from the group consisting of hydroxy units (ii), (iii), (iv) and a non-hydroxy acid comonomer.

11. A process of claim 10, wherein the R- configuration of the polyhydroxy acid polymer comprises 85-96 mol % of the assymmetrical carbon atoms.

12. A process of claim 3, wherein the polyhydroxy acid polymer comprises (OCR'R"COOCR'R"CO)q, and wherein R' comprises hydrogen and R" comprises a methyl radical and further comprising about 80–97 mol % of asymmetric carbon atoms R- configuration and about 3–20 mol % S- configuration.

13. A process of claim 3, wherein the polyhydroxy acid polymer comprises (OCR'R"COOCR'R"CO)q, and wherein R' comprises hydrogen and R" comprises a methyl radical and further comprising about 85-96 mol % of asymmetric carbon atoms R- configuration and about 4–15 mol % S- configuration.

14. A process of claim 13, wherein the polymeric composition consists essentially of 94 to 99.8 wt % polyhydroxy acid polymer and from 0.2 to 6 wt % plasticizer.

15. A process of claim 13, wherein the polymeric composition consists essentially of 99.6 to 99.8 wt % polyhydroxy acid polymer and from 0.2 to 0.4 wt % plasticizer.

16. A process of claim 15, wherein the concentration of plasticizer in the polymeric composition is controlled by polymerizing the polyhydroxy acid polymer from a mixture comprising lactides and acids to produce a plasticizer-containing product, and further comprising reducing the plasticizer concentration by devolatilization in the melt processing apparatus.

17. A film made by the process of claim 1.

18. A film of claim 17, having a shrinkage value greater than about 40% at 100° C.

19. A film of claim 18, having a shrink force of about 2 KPa to 8 KPa over a temperature range of about 70° to 150° C.

20. A film of claim 18, having a tensile strength of about 100 MPa to 200 MPa and an elongation at break of about 40 to 100%.

21. A process for making a self-supporting polymer film comprising:
(a) melt processing a polymeric composition comprising:
(I) from about 92 to about 99.9 wt % of a polyhydroxy acid polymer comprising at least one hydroxy acid unit selected from the group consisting of:
(i) (OCR'R"COOCR'R"CO)q;
(ii) [O(CR'R")nCO]p;
(iii) (OCR'R"CR'R"OCR'R"CO)r;
(iv) (OCR'R"CR'R"OCR'R"CR'R"CO)s; and
(v) copolymers of (i)–(iv) with non-hydroxy acid comonomers
wherein n is 2, 4 or 5;
p, q, r and s are integers, the total of which ranges from about 350 to about 5,000; and R'and R" comprise at least one material selected from the group consisting of hydrogen, a hydrocarbyl containing 1 to 12 carbon atoms, and substituted hydrocarbyl containing 1 to 12 carbon atoms; and
(II) from about 0.10 to about 8 wt % plasticizers comprising at least one plasticizer selected from the group consisting of monomeric hydroxy acids, cyclic dimers of monomeric hydroxy acids, non-cyclic dimers of monomeric hydroxy acids and oligomers of monomeric hydroxy acids having a molecular weight of up to about 450;
(b) forming said composition into a film; and
(c) biaxially orienting said film by stretching said film to at least two times the initial machine direction and transverse direction dimensions of said film, wherein the orienting is conducted at a temperature above the polyhydroxy acid glass transition temperature and below the melting temperature of the composition; and
(d) heat-setting the biaxially oriented film by heating said film to a temperature above the polymer glass transition temperature but below the polymer melt temperature while maintaining the film under restraint.

22. A process of claim 21, wherein said polyhydroxy acid polymer has an average molecular weight from about 150,000 to about 450,000.

23. A process of claim 22, wherein the heat-set duration is performed from about 1 to about 80 seconds.

24. A process of claim 22, wherein the polyhydroxy acid polymer comprises hydroxy acid unit (i) R' comprises hydrogen and R"comprises the methyl radical and further comprising about 85–96 mol % of asymmetric carbon atoms R- configuration and about 4–15 mol % S- configuration.

25. A process of claim 24, wherein the polymeric composition consists essentially of about 94 to about 99.8 wt % polyhydroxy acid polymer and from about 0.2 to about 6 wt % plasticizer.

26. A process of claim 24, wherein the polymeric composition consists essentially of about 99.6 to about 99.8 wt % polyhydroxy acid polymer and from about 0.2 to about 0.4 wt % plasticizer.

27. A film made by the process of claim 22.

28. A film made by the process of claim 22, having a shrinkage value less than about 5% at 100° C.

29. A film made by process of claim 22, having tensile strength of about 80 MPa to 140 MPa and an elongation at break of 30 to 80%.

30. A self-supporting polymer film comprised of:
(I) from about 92 to about 99.9 wt % polyhydroxy acid polymer comprising at least one hydroxy acid unit selected form the group consisting of:
(i) (OCR'R"COOCR'R"CO)q;
(ii) [O(CR'R")nCO]p;
(iii) (OCR'R"CR'R"OCR'R"CO)r;
(iv) (OCR'R"CR'R"OCR'R"CR'R"CO)s; and
(v) copolymers of (i)–(iv) with non-hydroxy acid comonomers
wherein n is 2, 4 or 5;
p, q, r and s are integers, the total of which may range from about 350 to 5,000; R' and R" comprise at least one member. selected from the group consisting of hydrogen, a hydrocarbyl containing 1 to 12 carbon atoms, and a substituted hydrocarbyl containing 1 to 12 carbon atoms, and
(II) from about 0.10 to about 8 wt % plasticizers comprising at least one plasticizer selected from the group consisting of monomeric hydroxy acids, cyclic dimers of monomeric hydroxy acids, non-cyclic dimers of monomeric hydroxy acids and oligomers of monomeric hydroxy acids up to molecular weight of about 450.

31. A film of claim 30, wherein the polyhydroxy acid component has weight an average molecular weight from about 150,000 to 450,000.

32. A film of claim 31 wherein the polyhydroxy acid component comprises hydroxy acid units (i) wherein R'comprises hydrogen and R" comprises the methyl radical and further comprising about 85–96 mol % of asymmetric carbon atoms R- configuration and 4–15 mol % S- configuration.

33. A film of claim 32, wherein the polymer film consists essentially of 94 to 99.8 wt % polyhydroxy acid polymer and from 0.2 to 6 wt % plasticizer.

34. A film of claim 32, wherein the polymer film consists essentially of 99.6 to 99.8 wt % polyhydroxy acid polymer and from 0.2 to 0.4 wt % plasticizer.

35. A film of claim 31, wherein said film possesses a shrinkage value less than 5% at 100° C.

36. A film of claim 31, wherein said film possesses a tensile strength of 80 MPa to 140 MPa and an elongation at break of 30 to 80%.

37. A film of claim 31, wherein said film possesses a tensile strength of 100 MPa to 200 MPa and an elongation at break of 40 to 140%.

38. A process of claim 3, wherein the polyhydroxy acid polymer comprises: about 55 to about 99 mol % (OCR'R"COOCR'CR"CO)q, wherein R' comprises hydrogen and R" comprises a methyl radical, and said (OCR'R"COOCR'R"CO)q comprises about 80 to 97 mol % S- configuration and about 3 through 20 mol % R- configuration, and further comprising about 1 through about 45 mol % of at least one member selected from the group consisting of hydroxy unit (ii), (iii), (iv) and a suitable non-hydroxy acid comonomer.

39. A process of claim 3, wherein the polyhydroxy acid polymer comprises: (OCR'R"COOCR'R"CO)q, wherein R' comprises hydrogen and R" comprises a methyl radical, and further comprising about 80 to 97 mol % S- configuration and about 3 to 20 mol % R- configuration.

40. A process of claim 3, wherein the polyhydroxy acid polymer comprises: (OCR'R"COOCR'CR"CO)q, wherein R' comprises hydrogen and R" comprises a methyl radical, and further comprising about 85 through 96 mol % S- configuration and about 4 through 15 mol % R- configuration.

41. A process of claim 22, wherein the polyhydroxy acid polymer comprises: (OCR'R"COOCR'CR"CO)q, wherein R' comprises hydrogen and R" comprises a methyl radical, and further comprising about 85 through 96 mol % S- configuration and about 4 through 15 mol % R- configuration.

42. A process of claim 31, wherein the polyhydroxy acid polymer comprises: (OCR'R"COOCR'CR"CO)q, wherein R' comprises hydrogen and R" comprises a methyl radical, and further comprising about 85 through 96 mol % S- configuration and about 4 through 15 mol % R- configuration.

* * * * *

UNITED STATES PATENT AND TRADEMARK OFFICE
CERTIFICATE OF CORRECTION

PATENT NO.  : 5,076,983
DATED       : December 31, 1991
INVENTOR(S) : Ostapchenko, et al It is certified that error appears in the above-indentified patent and that said Letters Patent is hereby corrected as shown below:

On the title page, page, item [75] Inventors: Delete "Gary L. Loomis" and insert -- Richard G. Sinclair--.

Signed and Sealed this

Sixteenth Day of January, 1996

*Attest:*

BRUCE LEHMAN

*Attesting Officer*        Commissioner of Patents and Trademarks